Apr. 17, 1923.
M. A. SPENCER
1,452,226
BOLL WEEVIL DESTROYER
Filed Nov. 21, 1922
2 Sheets-Sheet 2
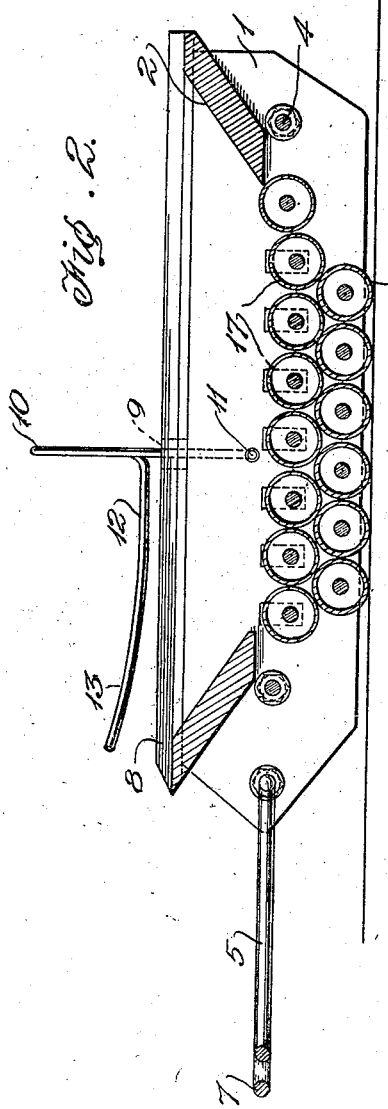
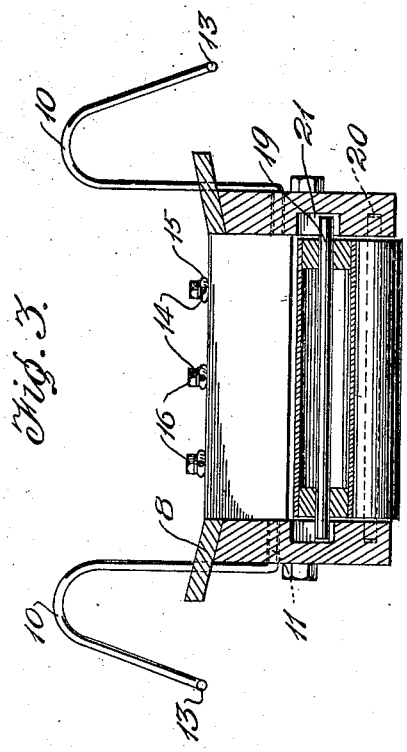
Inventor
M. A. Spencer,
William C. Linton.
Attorney Patented Apr. 17, 1923.

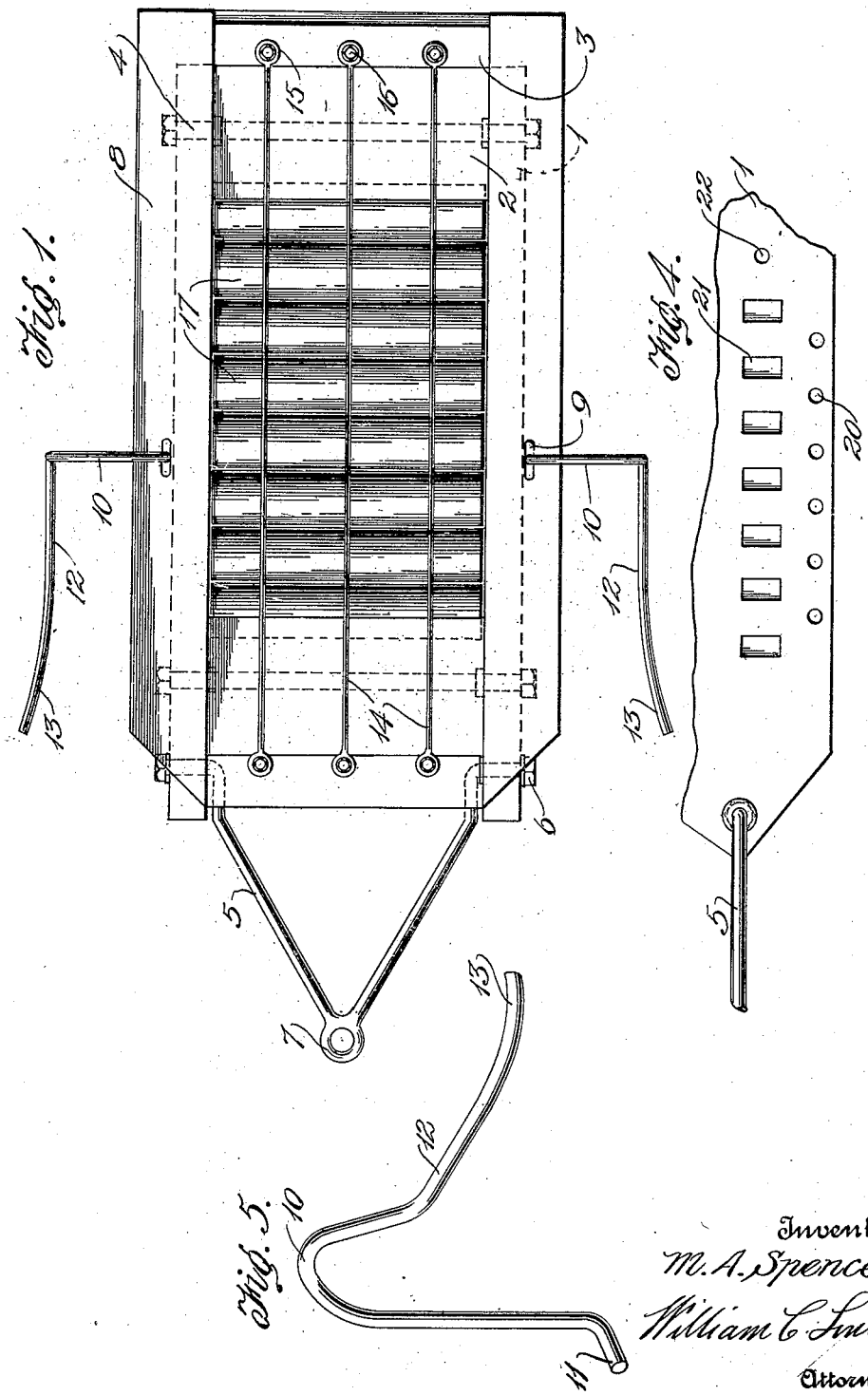

1,452,226

UNITED STATES PATENT OFFICE.

MADISON A. SPENCER, OF YONKERS, NEW YORK, ASSIGNOR OF ONE-HALF TO BERT E. NUSSBAUM, OF MUSKOGEE, OKLAHOMA.

BOLL-WEEVIL DESTROYER.

Application filed November 21, 1922. Serial No. 602,331.

*To all whom it may concern:*

Be it known that I, MADISON A. SPENCER, a citizen of the United States of America, residing at Yonkers, county of Cherokee, State of Oklahoma, have invented certain new and useful Improvements in Boll-Weevil Destroyers; and I do hereby declare that the following is a full, clear, concise, and exact description of the invention, such as will enable others skilled in the art to which it appertains to make and use the same.

This invention has reference to improvements in insect destroyers, having for an object to provide a device especially advantageous for effecting the removal of boll weevils from cotton plants and positively effecting their destruction, the invention comprehending a novel but simple arrangement of mechanical elements which are caused to be operated with movement of the device over a field growing cotton plants therein.

Another and equally important object of the invention may be stated to provide a boll weevil destroying device which will also serve as a practical and efficient land cultivator, causing the clods of earth encountered thereby during its travel through a field to be broken and pulverized, thus promoting the growth of vegetation therein.

Other objects will be in part obvious and in part pointed out hereinafter.

In order that the invention and its mode of operation may be readily understood by persons skilled in the art, I have in the accompanying illustrative drawings, and in the detailed following description based thereon, set out one possible embodiment of the same.

In these drawings:—

Figure 1 is a top plan view of the improved boll weevil destroyer;

Figure 2 is a vertical longitudinal section therethrough;

Figure 3 is a vertical transverse section through the same;

Figure 4 is a fragmentary detail in elevation showing one side member of the frame of the device and the manner in which the rollers are provided bearing therein; and, Figure 5 is an enlarged detail in perspective of one of the plant brushing arms.

Having more particular reference to the drawings, in connection with which like characters of reference will designate corresponding parts throughout, the device may be stated to comprise a frame consisting of parallel longitudinally disposed side members indicated by the numeral 1, while a hopper-like device 2 is arranged in the upper portion of said frame side members, which latter are inter-connected by means of transversely disposed bolsters or end pieces 3, tie bolts or rods 4 passing transversely through the frame and having their opposite ends suitably anchored in adjacent portions of said side members 1 as clearly shown in the Figures 1 and 2. A draft connection 5 consisting of a substantially V-shaped rod having right angularly formed extremities is provided the device and is arranged adjacent one end thereof, the free portions of the angular extremities of the draft connection passing through openings in the adjacent or forward ends of the side members 1, as shown in the Figure 1 and having lock nuts 6 turned into engagement therewith for an obvious purpose. An eyelet or draft hook receiving opening 7 is formed in the forwardly disposed end of the connection 5 and as will be understood, will facilitate the connection of suitable draft means to the device.

The construction of the hopper-like device 2 includes diagonally disposed side members which are arranged adjacent the upper marginal portions of the side members 1, being secured thereto by suitable means, and in the intermediate portions of these inclined side members which are indicated for the purpose of convenience by the numeral 8, slots 9 are formed, while openings are formed in the outer faces of the adjacent or corresponding intermediate portions of the side members 1. These slots 9 and the openings formed in the corresponding or adjacent portions of the side members 1 serve as means for receiving cotton plant brushing arms generally indicated by the numeral 10, such arms consisting of metal rods including body portions which are adapted to be passed vertically and downwardly through the slots 9 in the inclined side members 8, whereat right angularly disposed fingers 11 formed on their lower extremities are engaged in said openings formed in the adjacent or corresponding portions of the several side members 1, thus serving to anchor or retain the vertically disposed body portions of said arms 10 in their vertical or substantially upright position. The upper or remaining extremities of the arms 10 are provided with horizontally disposed fingers 12 having their free inner ends curved outwardly as at 13 and adapted to be disposed with relation to the opposite side members 1 of the frame in the manner as shown in the Figure 1. Thus, it will be understood that because of the arrangement of these arms 10 with their respective fingers 12 when the destroyer is moved over a field or other surface, the fingers 12 with their curved free extremities 13 will serve to gather in the cotton plants and to shake or vibrate the same sufficiently to cause the boll weevils thereon to release their holds on the plant and to fall therefrom onto the inclined side members or boards 8 of the hopper-like device 2, whereupon they will be directed by said hopper-like device 2 into the destroying means of the destroyer, hereinafter more fully described.

To prevent portions of the cotton plant or debris from falling through the hopper-like device 2 into engagement with the destroying means in a manner to hinder operation of the same, I may and preferably do provide a plurality of longitudinally disposed relatively parallel rods or bars 14, arranging the same over the open upper portion of the hopper-like device 2 and forming eyelets 15 upon their opposite ends which receive bolts or other suitable fastening devices 16 therethrough in order that they will be rigidly secured to the adjacent portions of the oppositely disposed end pieces 3.

With a view towards providing means for destroying the boll weevils directed into the device by way of the hopper-like arrangement 2, I provide a plurality of pairs of horizontally arranged juxtaposed rollers indicated by the numerals 17 and 18, said rollers having axles 19 extending therethrough whereby to provide means for effecting their connection with the opposite side members 1 of the frame of the device. The extremities of the axles of the roller series of juxtaposed rollers 18 are engaged in bearing pockets 20 formed upon the inner sides of the lower portions of the opposite side members 1 and so arranged as to cause the lower portion of said rollers to project beyond the lower marginal portions of said side members, hence permitting said lower series of rollers to serve as a movable supporting means for the frame of the destroyer. In this connection, it is to be noted that the juxtaposed rollers 17 and 18 are disposed transversely of the frame of the destroyer and that the rollers of the several series contact, thus providing a frictional connection as between the same whereby rotary motion from the lower series of rollers will be imparted to the upper series.

Certain of the rollers 17 of the upper series have the opposite extremities of their respective axles 19 engaged in substantially rectangular or elongated bearing pockets 21 formed upon the lower portions of the inner sides of the side members 1 and arranged in staggered relationship with respect to the bearing pockets 20. However, one of these rollers 17 of the upper series has the opposite ends of its particular axle 19 engaged in bearing pockets 22 formed upon corresponding portions of the side members 1 in a manner which will permit of only rotation of the same without vertical movement with relation to the side members 1.

Because of the vertically movable mounting of certain of the rollers 17 of the upper series with respect to the side members 1 of the destroyer frame, it will be understood that they will be permitted to remain in contact with the adjacent rollers 18 of the lower series. However, should stones, branches, twigs or other debris be engaged therebetween, these movably mounted rollers will be permitted to automatically adjust themselves to compensate for the size of such matter and permit the same to pass between the several series of rollers without injury or damage thereto. When such matter has passed through the rollers, the vertically movable rollers 17 of the upper series will immediately return to their normal or contacting positions with the adjacent rollers 18 of the lower series and the transmission of rotary motion to the former will continue.

From the foregoing, it will be seen that when my improved destroyer is drawn or propelled over a field growing cotton plants therein, the plant brushing arms 10 will engage and vibrate the plants sufficiently to dislodge the boll weevils therefrom. Because of the formation and arrangement of these arms 10 with respect to the opposite sides of the frame of the destroyer, the boll weevils dislodged from the cotton plants will be directed by way of the hopper-like device 2 and its inclined side members 8 into engagement with the transversely disposed upper series of vertically movable rollers 17. These rollers are now rotating by reason of their frictional contact with the lower series of rollers 18 moving over the field, and in consequence, the boll weevils discharged onto said upper series of rollers will be caused to pass between the same and the lower series of rollers 18 and hence, effectually destroyed or crushed prior to their discharge onto the surface of the field. In addition to serving as an effectual form of boll weevil destroyer, the device will also be found to provide an efficient and practical form of land cultivator, the lower series of rollers 18 breaking and pulverizing such clods of earth as may be encountered thereby during travel of the destroyer over a field.

It is to be understood that the series of superposed rollers may be increased in number should it be so desired and likewise, that the number of rollers in each particular series may be increased or decreased, such as conditions or preference may dictate. Likewise, the number of plant brushing arms may be increased should the size of the destroyer warrant the same.

Because of the novel construction of the frame of the device, it will be understood that the same may be readily disassembled to permit replacement or repairing of any of the rollers of the several series supported therebetween, this being effected merely by removing the tie bolts or rods 4 and effecting the desired replacement or repairs.

Manifestly, the construction shown is capable of considerable modification and such modification as is within the scope of my claims, I consider within the spirit of my invention.

I claim:

1. A boll weevil destroyer comprising a frame having an open top and bottom, superposed series of horizontally arranged juxtaposed rollers supported in the lower portion of said frame and disposed transversely of the same, the lower series of rollers movably supporting said frame, and draft means connected to one end of the frame.

2. A boll weevil destroyer comprising a frame having an open top and bottom, superposed series of horizontally arranged juxtaposed intercontacting rollers supported in the lower portion of said frame and disposed transversely thereof, the lower series of rollers movably supporting said frame, and draft means connected to one end of said frame.

3. A boll weevil destroyer comprising a frame having an open top and bottom, superposed series of horizontally arranged juxtaposed intercontacting rollers rotatably supported in the lower portion of said frame and disposed transversely thereof, certain of said series of rollers being vertically adjustable with respect to the remaining series of rollers, the lower series of rollers movably supporting said frame, and draft means connected to one end of said frame.

4. A boll weevil destroyer comprising a frame having an open top and bottom, superposed series of horizontally arranged juxtaposed intercontacting rollers rotatably supported in the opposite sides of the lower portion of said frame and disposed transversely thereof, the upper series of said rollers being vertically adjustable with relation to the lower series of rollers, a hopper-like device arranged in the upper portion of said frame having its lower end discharging onto said upper series of rollers, the lower series of rollers movably supporting said frame, and draft means connected to one end of the frame.

5. A boll weevil destroyer comprising a frame having an open top and bottom, superposed series of horizontally arranged juxtaposed intercontacting rollers rotatably supported in the lower portion of said frame and disposed transversely thereof, plant brushing arms supported upon the opposite sides of said frame, the lower series of rollers movably supporting said frame, and draft means connected to one end of said frame.

6. A boll weevil destroyer comprising a frame consisting of longitudinally disposed parallel side members having a series of horizontally arranged circular bearing pockets formed upon the inner sides of their lower portions and a superposed series of horizontally arranged elongated bearing pockets formed in their inner sides and arranged in staggered relation to said first pockets, series of rollers disposed transversely of said frame having rotatable engagement in said circular and elongated bearing pockets, end pieces arranged between and adjacent the opposite ends of said side members, and means engaging the opposite end portions of said side members for clampingly engaging the same with said end pieces.

7. A boll weevil destroyer comprising a frame consisting of longitudinally disposed parallel side members having each a series of horizontally arranged circular bearing pockets formed upon the inner sides of their lower portions and a series of elongated bearing pockets in said inner sides arranged in staggered relation to said first bearing pockets, a plurality of series of rollers arranged transversely of the frame having rotatable engagement in said series of circular and elongated bearing pockets, said rollers inter-contacting, end pieces arranged between the opposite end portions of said side members, means engaging the side members for clampingly connecting the same to said end members, a plant brushing arms arranged adjacent the outer sides of said side members, a hopper arranged in the upper portion of said frame discharging onto the upper series of rollers mounted therein, and draft means connected to one end of said frame.

In witness whereof I have hereunto set my hand.

MADISON A. SPENCER,